Patented Aug. 14, 1951

2,563,836

UNITED STATES PATENT OFFICE 2,563,836

REACTION BASE MATERIAL

Worth C. Goss, Seattle, Wash., assignor, by mesne assignments, to Edward S. Heller No Drawing. Application October 18, 1947, Serial No. 780,759

2 Claims. (Cl. 260—124)

This invention relates to a process of making, and to the various uses of a new composition of matter which I will hereinafter refer to a a "reaction base material." It relates further to the making of different reaction products by reacting different chemicals, or agents with my new reaction base material, and to the various uses of these different reaction products in the making of new and useful products.

More particularly, the present invention has to do, first, with the process of making that new composition of matter which I have referred to as a "reaction base material" from wood that has rotted or decayed under the action of cellulose consuming micro-organisms, particularly under the action of fungi or micro-organisms of that class known as "brown rot" fungi. Secondly, the invention has to do with the manner of reacting this particular reaction base material with various chemicals to produce chemical reaction products that have various general and specific uses.

It is the principal object of the present invention to produce a new composition of matter from decayed or rotted wood of the kind above designated, that can be readily and economically reacted with various chemicals to produce new reaction products that are useful in the making of various articles and compositions, particularly those designated as sheet lumber.

Another object of the invention is to produce a particularly useful chemical reaction product from brown rotted wood and ammonia that is especially effective and practical as a binder or glue for use in the manufacture of sheet lumber from ground or fiberized wood, or from certain other ground or fiberized cellulosic materials, and which chemical reaction product in this particular usage, is highly polymerizable at low temperature.

Yet another object of my invention is to provide a process for treatment of the rotted wood, product of the "brown rot" fungi, that is practical and economical for large quantity production of my reaction base material.

Before describing the present invention in detail, it will be mentioned that, in a previous application, filed by me on December 22, 1945, under Serial No. 637,107, now U. S. Patent Number 2,485,587 issued on October 25, 1949, I disclosed the making of "sheet lumber" from fiberized wood that was mixed with a binder and the mixture consolidated under the action of heat and pressure. The binder, in that instance, was described as being a "plastic" derived by wet grinding of wood that had decayed under the action of "brown rot" fungi.

By way of explanation it appears that this rotted wood substance differs materially from ordinary lignin such as is obtained as a by-product of the paper making industry. Two major points of difference exist. The first is that the methoxyl content is much less in the rotted wood substance than in pulp residue lignin. In general, the highest methoxyl content encountered in the brown rotted wood is about 12.7%, while pulp liquor lignin in general contains 15 to 22% methoxyl. The brown rotted wood appears not to be lignin at all but a chemical complex which contains as a portion of the molecule thereof a lignin-like complex. This purified plastic in general will analyze about 75% lignin, and on more extreme treatment (that is, a greater concentration of ammonia and higher temperature) with the ammonia purifying agent, the lignin content will increase somewhat, to as high as 88% lignin. However, the plastic formed by this more drastic treatment is not as satisfactory for use as the plastic which contains about 75% lignin.

It is now to be explained further that the brown rotted wood which was then used, and which also is used in the present invention, comprises three separable fractions. One of these is an acidic substance constituting from 7 to 20% by weight of the material, which is rendered soluble by long continued hydrolysis in hot water and can be removed from the material by continued extraction in hot water. Preferably, however, the acid is rendered soluble by neutralization of the brown rotted wood with an agent such as sodium hydroxide, or potassium hydroxide or ammonium hydroxide, and the washing away of the resultant soluble organic salts. It is important, however, that if potassium hydroxide or sodium hydroxide is used extreme care must be taken to wash away the metal organic salts.

The present invention, in so far as it relates merely to the provision, from the brown rotted wood, of a material usable as a glue or binder, is a departure from the previous invention, in that essentially all of the acidic substances are now removed from the brown rotted wood, while the other fractions are undisturbed. This purified rotted wood is a derivative of lignin which is capable of polymerization at low temperatures in the presence of a suitable catalyst such as acetic or oxalic acids. This substance is the "reaction base material" of the present invention.

By way of further explanation, I prefer as a source of brown rotted wood the residue of Douglas fir tree found in the forest regions of western United States and Canada. This rotted residue is brown in color, analyzes 70% or over in lignin content and is found naturally in enormous quantities. I have discovered that there is a natural preservative agent present in Douglas fir wood which aids in and promotes the growth of the so-called brown rot fungi, or in other words, cellulose-consuming fungi. This preservative agent tends to keep intact giant fallen trees, which trees when rotted form a solid mass of material suitable for the practice of this invention. The preservative substance in Douglas fir wood, which causes and promotes the formation of the brown rot, appears to be an acid catechol tannin, the catechol content of which is about 55/100 of 1% of the weight of the wood. It is of course possible to prepare brown rotted wood artifically by the action of certain specific micro-organisms, notably polyporous Schweinitzii, which is of the fungus family. This brown rotted wood, whether obtained naturally or by artificial means, is the starting material for the plastic of the present invention.

It is to be explained also, that in the preparation of fiberized wood for the making of sheet lumber, I select live wood which is reduced to chips or small pieces, and these steamed or treated in hot water, and then reduced to fibers. The fibers were mixed with the binder, preferably in the fiberizing machine, and then formed into matted layers that were consolidated under the action of heat and pressure.

It is now recognized that in the use of the preferred form of my binder, which is the product of reacting the base material with ammonia or other agent, the acid in certain wood fibers catalyzes the polymerization of the binder to bring about the increased strength, hardness and water repellant characteristics of the boards. With certain species of wood such as ponderosa pine, acetic or oxalic acids should be added to make the plastic set quickly. Excess ammonia in the plastice will also catalyst the hardening of the binder.

The making of the reaction base material, the various reaction products constituting the glue or binder, and the lumber itself will now be described.

First, to prepare my "reaction base material" which is the basis of the invention, and which is used in its various embodiments as the starting product, I select, preferably but not necessarily, a proper quantity of wood that has decayed or rotted on the forest floor under the action of cellulose consuming micro-organisms, to the condition of brown rot; the selected material being in fact a wood residue that is brown in color and which analyzes sixty per cent or more of lignin by acid analysis. However, this brown rotted wood, instead of that produced by natural processes over a period of years, might if necessary be more quickly produced from live wood by reducing the wood to sawdust form, and subjecting it to the action of synthetic culture as has been disclosed in my co-pending application filed on November 30, 1946, under Serial No. 713,393, now Patent No. 2,545,459.

The uses and characteristics of such brown rotted wood in the making of a binder for use in the manufacture of sheet lumber has been quite fully described in my copending applications filed under Serial Nos. 637,107 and 680,838, now abandoned in view of an application filed on June 13, 1949, under Ser. No. 97,759, and it is to be considered that the present invention is in the nature of an improvement on the inventions set forth therein and also with respect to the disclosures of the application filed on November 30, 1946, under Serial No. 713,393.

This "brown rotted wood" or "wood residue," as above identified, regardless of its originating through natural or artificial processes, will contain a substantial percentage of acidic substance or substances, usually between seven and twenty per cent by weight of the wood, which I remove. To aid in the removal of this acidic substance in a most complete and satisfactory manner, the rotted wood is first reduced, by passing it through a grinder or reducing machine, to a condition of fineness corresponding substantially to that of finely ground coffee. To grind it too fine is a detriment as presently explained. The acidic substance or substances (principally humic acid) may then be expeditiously and economically removed from the reduced material by washing the material in hot (150° F.) weak alkali solution, thus neutralizing the acidic constituent thereof and separating the water soluble organic salts, that result from the neutralizing process, from the material. The neutralization of the acidic substances can be quickly and easily accomplished with sodium hydroxide (NaOH) or potassium hydroxide (KOH), or preferably ammonium hydroxide.

To expedite the neutralization of the acidic content of the ground wood residue, it is most practical to heat the reduced material in water and to add the neutralizing agent thereto in dissolved state while the material is being stirred or agitated. The neutralizing operation is carried on until the plastic or solid substance by test shows a pH of 5.5 or higher. Preferably neutralization should be carried on until the test shows a pH of 8.0, and then the hot (150° F.) liquid, containing the dissolved organic salts, is centrifuged off and the solid material or wood residue is washed in clean fresh water until the wash water shows no discoloration.

The brown rotted wood or wood residue, thus freed of its acidic substances, is the reaction base material of the present invention. To get this into the most desirable form for use as a glue or binder, it may be ground in water to a thin, paste-like consistency that permits it to be spread over wood surfaces, as in the making of plywood, or mixed with wood fibers for the pressing of sheet lumber.

In my co-pending application filed under Serial No. 680,840, on July 1, 1946, now abandoned, I have described quite in detail, a method of mixing or coating wood fibers with a similar plastic preparatory to making sheet lumber. The described method is characterized by the passing of steamed wood chips or hogged fuel through an attrition type grinder, together with a designated amount of the plastic that will result in the fibers being evenly and effectively coated with the plastic.

The plastic coated fibers are then sifted to form a matted layer of predetermined thickness and this is consolidated under the action of heat and pressure in a steam vented press to form the lumber sheet.

While the wood residue, freed of its acidic substances as above described and ground to the consistency of paste, makes a very effective glue and binder, it is the teaching of this application that it gains very valuable properties for use in the making of sheet lumber from fiberized wood, as a reaction product resulting from reaction with ammonia.

As an example of my invention in producing the reaction base material and the reaction product therefrom, a quantity of brown rotted wood or wood residue analyzing about 70% lignin content by acid analysis, was ground through an attrition type grinder to between twenty and sixty mesh size and was suspended in water. To this about 2.2% of potassium hydroxide, based on the dry weight of the rotted wood, was added and the solution then heated until the acidity test showed a pH reading of approximately 7.0. The dark brown liquor, resulting from this neutralizing treatment was then centrifuged and the solid material remaining was then repeatedly washed in fresh hot water until the wash water showed no discoloration. For final grinding water is then added, leaving about one pound of acid free lignin-like substance to each six pounds of water. The desirability for the original grinding of wood residue to approximately the condition of ground coffee is here apparent for finer grinding makes it difficult to separate the water. To this reaction base material, ammonium hydroxide was then added to show a pH of 9.0 and a nitrogen content on analysis of about 1%. This was followed by grinding the stock to a very fine paste in a pebble mill. This product, which I designate the "Ammonia Reaction Product," in this paste-like form, is ready for use in the making of sheet lumber in accordance with the teachings of the use of the plastic in my various co-pending applications. This reaction product has the property of setting hard very quickly at low temperatures such as 212° F.

The use of this reaction product contemplates its being mixed with the wood fibers, in any suitable manner, and a layer of the mixture of fibers and plastic then being sifted to form a matted layer of specified thickness, which layer is subjected to consolidating heat and pressure in a suitable press.

A specified recitation of steps which I prefer to follow in the making of sheet lumber from fiberized wood and this ammonia reaction product would be the following: First, wood chips treated for about five minutes in steam, or hot water, are passed together with the paste-like reaction product which I call the binder, through an attrition type mill; the proportions being from 60 to 95% by weight of wood fibers to from 5 to 40% of binder. The binder coated wood fibers that come from the mill are sifted onto a surface to form a matted layer of substantial thickness. This wet matted layer is then passed into a press with steam vented platen, or into any other type of press that is suitably vented for steam escapement, and is consolidated under the action of heat and pressure. The binder or reaction product permits, in this consolidating operation, the consolidated sheet to be removed from the press while hot and still containing up to 40% moisture, and with steam venting from the pores of the board, thus reducing the pressing time materially below that where absolute dryness of the sheet is required before it is safe to remove it. It is the ability of the reaction product to set or polymerize at temperatures as low as 212° F. that makes the quick removal of the board possible.

After the consolidated sheet is removed from the press, it is then baked in an oven at a temperature of about 360° F. to complete the polymerization of the plastic and to render the board water repellent.

As an alternative procedure, the plastic coated fibers, as delivered from the grinder, are dried at low temperatures and then sifted to provide a matted layer of material that can be consolidated in an atmosphere of high pressure steam as has been described in my application filed under Serial No. 726,840, now U. S. Patent No. 2,480,851 issued on September 6, 1949. In the use of this plastic, 10% of plastic with 90% of raw wood fiber makes an excellent board.

Another useful reaction product is a new composition of matter produced by chemically reacting urea (25 G.) with my "reaction base material" (100 G.) This forms a very strong, tough, plastic substance that takes longer to set than the ammonia reaction product.

Still another reaction product which is very water repellent, and heat resistant, is the chemical reaction product of pyro catechol and my "reaction base material." These substances combine in widely differing proportions.

In the following claims, the term "brown rotted wood" will be used to designate wood that has decayed to the condition of brown rot under the action of cellulose consuming micro-organisms, particularly those of the class known as "brown rot" fungi, and pertains also to wood that has decayed naturally or that artificially produced as disclosed in my co-pending application filed on November 30, 1946 under Serial No. 713,393.

Having thus described my invention, what I claim as new therein, and desire to secure by Letters Patent is:

1. The process of preparing a reaction base material comprising reducing brown rotted wood to fine degree, heating the reduced material in a bath of hot water, adding an alkali neutralizing agent to the water while agitating the mixture until the solid substance has a pH test of from 5.5 to 9.0, removing the liquid and its contained organic salts from the solid material and washing the material in fresh water until the wash shows no discoloration.

2. The process of preparing a reaction base material comprising reducing brown rotted wood to a degree comparable to that of ground coffee, heating the reduced material in a bath of water of a temperature of about 150° F., dissolving an alkali neutralizing agent and adding it to the mixture, while agitating the latter, until the solid material has a pH test of from 5.5 to 9.0, separating the solid material from the liquid, washing the material in fresh water until the wash water shows no discoloration, and grinding the washed material to paste-like consistency.

WORTH C. GOSS.

REFERENCES CITED

The following references are of record in the file of this patent:

UNITED STATES PATENTS

| Number | Name | Date |
| --- | --- | --- |
| 1,252,332 | Earp-Thomas | Jan. 1, 1918 |
| 1,631,834 | Schorger | June 7, 1927 |
| 2,193,493 | Ritter | Mar. 12, 1940 |
| 2,485,587 | Goss | Oct. 25, 1949 |

FOREIGN PATENTS

| Number | Country | Date |
| --- | --- | --- |
| 339,808 | Great Britain | of 1929 |
| 497,960 | Great Britain | of 1938 |

OTHER REFERENCES

Huber 38 C. A. 2765 (1944).

Rose et al., Journal of Ind. and Eng. Chem., March 1917, pages 284 to 287.

Thaysen et al., "The Microbiology of Cellulose," 1927, page 300.